May 14, 1940.  B. A. DIGGINS  2,200,595

APPARATUS FOR TESTING VISION

Filed Feb. 24, 1938

BARTHOLOMEW A. DIGGINS
*INVENTOR.*

BY  *[signature]*

ATTORNEY.

Patented May 14, 1940

2,200,595

UNITED STATES PATENT OFFICE 2,200,595

APPARATUS FOR TESTING VISION

Bartholomew A. Diggins, Irondequoit, N. Y., assignor to Bausch & Lomb Optical Company, Rochester, N. Y., a corporation of New York Application February 24, 1938, Serial No. 192,266

4 Claims. (Cl. 88—20)

The present invention relates to an apparatus for testing eyes.

One of the objects of the present invention is to provide a simple and efficient apparatus for testing eyes in which the minimum discernible contrast is used as the measure of visual acuity. Another object is to provide an apparatus for testing eyes at different levels of illumination. A further object is to provide an apparatus for testing vision in which the contrast of the test object and the total intensity of illumination can be readily varied at will. These and other objects and advantages reside in certain novel features of construction, arrangement and combination of parts as will hereinafter be more fully set forth and pointed out in the appended claims.

Referring to the drawing.

Figure 1:
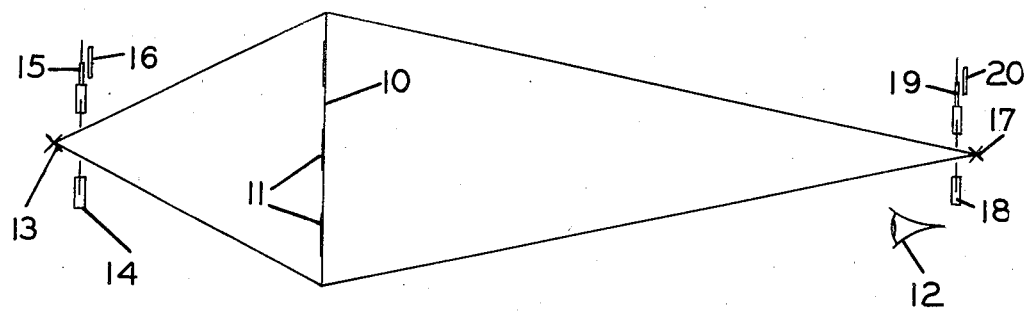
Fig. 1 is a diagrammatic view of an apparatus embodying my invention.
Figure 2:
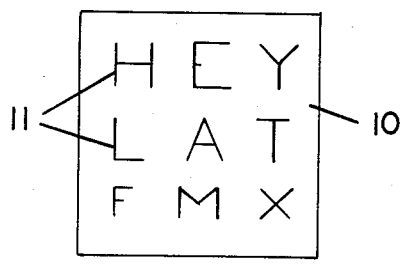
Fig. 2 is a rear elevation of the screen.
Figure 3:
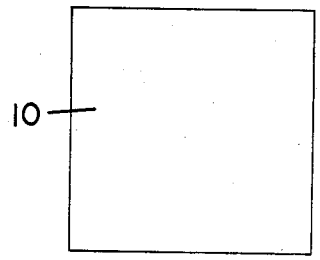
Fig. 3 is a front elevation of the screen.
Figure 4:
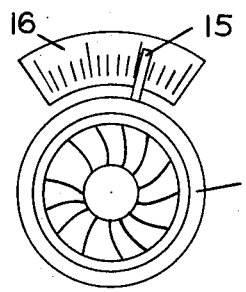
Fig. 4 is an elevation of the illumination controlling and indicating means.

In the embodiment of my invention schematically shown in the drawing, 10 designates a translucent screen which may be of glass, paper or other suitable substance, having test characters 11 secured on its rear surface. These test characters 11 may be opaque or colored and may be made of any suitable material such as paper, for example, and may be secured to the screen 10 in any suitable way.

The patient indicated by the eye 12 is positioned in front of the screen 10, that is, on the side opposite the characters 11. A light source 13 is located behind the screen 10 and illuminates the screen causing the test characters to appear as silhouettes to the patient. The intensity of the light from the source 13 is controlled in any suitable manner as, for example, by an iris diaphragm 14. This diaphragm 14 is actuated by a lever 15 which cooperates with a scale 16 so that the intensity of the light from the source 13 can be both controlled and determined.

A second light source 17 is positioned in front of the screen, that is, on the same side as the patient and serves to illuminate the front surface of the screen 10. The intensity of the light from the second source 17 is also suitably controlled by an iris diaphragm 18. This diaphragm 18 is similar to the diaphragm 14 and its actuating lever 19 likewise cooperates with a scale 20 to indicate the amount of light received on the screen 10 from the second source 17.

In testing vision with my apparatus, the test characters 11 are constructed to predetermined sizes, such as the sizes of any of the standard test charts well known in the art. These characters 11 are secured on the rear surface of the screen 10 and the test may then be performed in several ways.

The simplest method of testing is by lighting the chart from the rear source 13 alone. Since the eye 12 sees the shadows of the test characters 11 contrasted with the illuminated portions of the screen 10, varying the intensity of the light by the diaphragm 14 changes the contrast between the shadow and the background. This variation of contrast thus becomes a direct measure of visual acuity and by determining the contrast at the point where the character is barely visible, the visual acuity can be accurately determined. In this simple method, the light source 17 is not used at all.

Another method of testing with the present apparatus is to illuminate the screen 10 from the source 13. The second source 17 is then lit and this second source projects a veiling glare on the screen 10. The intensity of light from the source 17 is varied by the diaphragm 18 until the test characters are barely visible. The refractionist, knowing from the scales 16 and 20 the amount of light reaching the screen 10 from each source, can readily determine the contrast and from that, the visual acuity.

When the simple method using only source 13 is practiced, the total illumination decreases with the contrast but by using both sources, any desired contrast can be obtained at any desired level of illumination. Thus the refractionist can detect not only errors of refraction but can also determine the most efficient level of illumination.

By making the test characters 11 of transparent colored material and placing various color filters before the light sources 13 and 17, the eyes can be tested for various color aberrations.

From the foregoing it will be apparent that I am able to attain the objects of my invention and provide a new and improved apparatus for testing visual acuity. Various modifications of the structure described can, of course, be made without departing from the spirit of my invention or the scope of the appended claims.

I claim:

1. An apparatus for testing the visual acuity of a patient by determining the minimum discernible contrast between a test object and its background at different levels of illumination, said apparatus comprising a translucent screen at which the patient is directed to look, an opaque test object on the rear side of the screen, a source of light behind the screen for illuminating the rear side of the screen, means for varying the intensity of light from said source, means for indicating the intensity of the light passing to the screen from said source, a second source of light positioned in front of the screen for illuminating the front side thereof, means for varying the intensity of the light from the second source and means for indicating the intensity of the light passing to the screen from the second source.

2. An apparatus for testing the visual acuity of a patient by determining the minimum discernible contrast between a test object and its background at different levels of illumination, said apparatus comprising a translucent screen at which the patient is directed to look, an opaque test object on the rear side of the screen, a light source behind the screen for illuminating the rear side of the screen, means for varying the intensity of the light from said source, a second light source in front of the screen for illuminating the front of the screen, and means for varying the intensity of the light from the second light source.

3. An apparatus for testing the visual acuity of a patient by determining the minimum discernible contrast between a test object and its background at different levels of illumination, said apparatus comprising a translucent screen at which the patient is directed to look, an opaque test object on the rear side of said screen, a light source behind the screen for illuminating the rear side of the screen, a second light source in front of the screen for illuminating the front of the screen and means for varying the intensity of the light for the second light source.

4. An apparatus for testing the visual acuity of a patient by determining the minimum discernible contrast between a test object and its background at different levels of illumination, said apparatus comprising a translucent screen at which the patient is directed to look, an opaque test object on the rear side of said screen, a light source behind the screen for illuminating the rear side of the screen, a second light source in front of the screen for illuminating the front of the screen, means for varying the intensity of the light for the second light source, and means for indicating the intensity of the light passing to the screen from the second light source.

BARTHOLOMEW A. DIGGINS.